March 1, 1949.                D. E. SUNSTEIN                 2,463,004
                              ELECTRICAL SYSTEM Filed Jan. 25, 1945                                       3 Sheets-Sheet 1

Fig.1

NULL INDICATOR

TUBE UNDER TEST

FOR BALANCE $$G_m = \frac{R_3 + R_4}{R_4 \cdot R_5}$$

WHERE NUMERICAL SUBSCRIPTS REFER TO COMPONENTS IN THE FIGURE

Fig.2

$$\frac{-\mu R_4 V_{in}}{R_3 + R_4}$$

DAVID E. SUNSTEIN, INVENTOR.

BY
Samuel Ostrolenk
Attorney

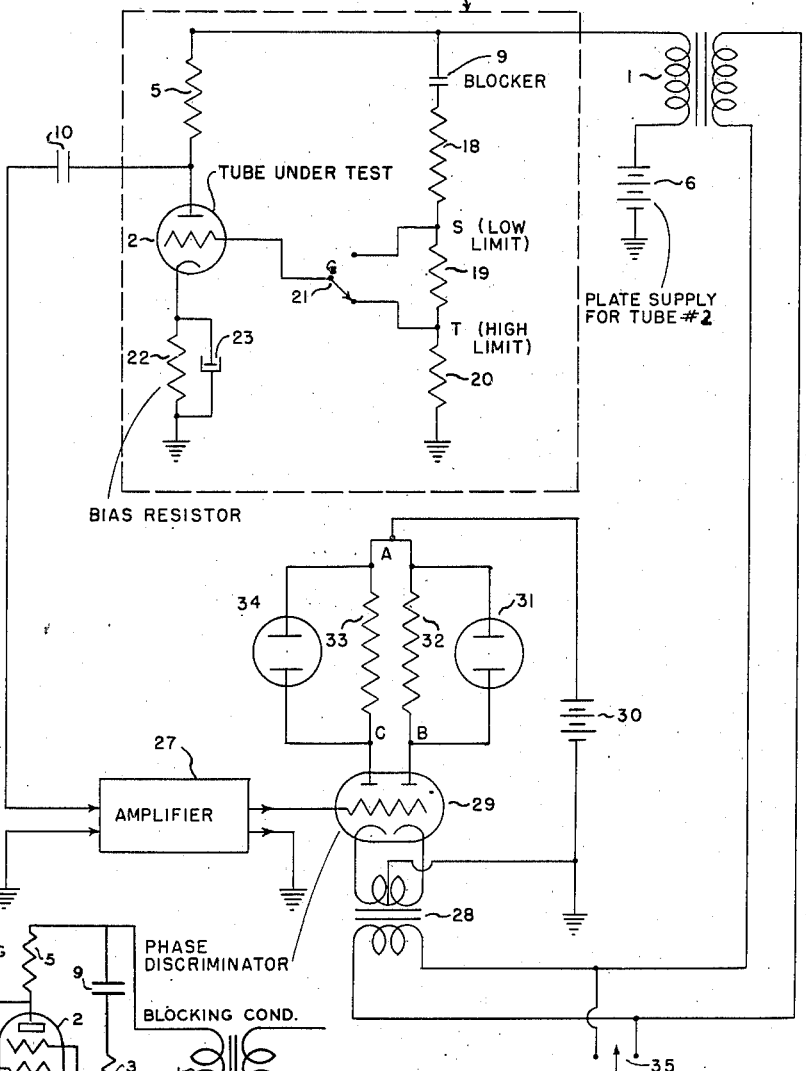

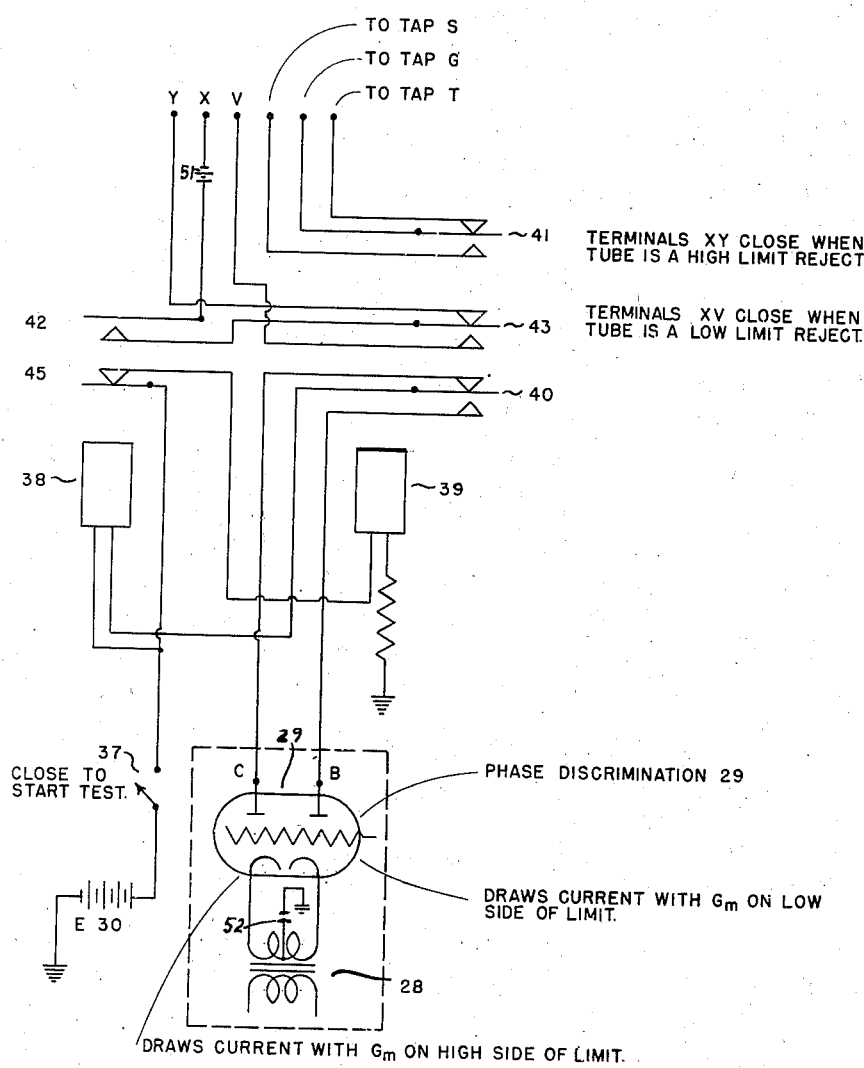

Patented Mar. 1, 1949

2,463,004

UNITED STATES PATENT OFFICE 2,463,004

ELECTRICAL SYSTEM

David E. Sunstein, Elkins Park, Pa., assignor to Philco Corporation, a corporation of Pennsylvania Application January 25, 1945, Serial No. 574,538

19 Claims. (Cl. 315—368)

This invention relates to measuring circuits for measuring the characteristic of vacuum tubes.

In particular, this invention relates to a method for measuring the mutual conductance of a vacuum tube. Moreover, this invention provides means whereby an automatic limit tester can be built from the circuit for the measurement purpose.

The circuits which have heretofore been used for the measurement of transconductance of vacuum tubes have all had the serious disadvantage from a practical viewpoint that it was not possible to use a signal source and a detector, both of which had one side grounded. This difficulty made it necessary to use transformers of a shielded type somewhere in the network. Such transformers are disadvantageous since they pick up 60 cycles easily from the surrounding magnetic field. It is desirable to eliminate the transformer heretofore regarded as necessary because then both the input and the output will have one side grounded.

My invention provides a circuit in which there is a common terminal between the input and output which enables this common terminal to be used as the ground terminal and thus simplifies the shielding requirements.

This I accomplish by supplying parts of the same signal to the plate of the tube and the grid of the tube simultaneously. The signal supplied to the plate of the tube is caused to flow through a plate resistor, and the signal supplied to the grid of the tube is dropped in magnitude by a voltage dividing resistor network. By proper adjustment of this network, a balance can be obtained between the voltage generated within the tube by the change in grid voltage and the voltage appearing across the resistor in the plate circuit. When these two effects balance, there is no alternating current component of potential between plate and ground, and the circuit is considered to be balanced. Under these circumstances it is a relatively simple matter to calculate algebraically the formula which will yield the mutual conductance of the tube in terms of the dropping resistors used for the grid potential and the resistor used in the plate circuit.

One possible method of procedure for the use of this instrument for the measurement of mutual conductance is then to adjust the grid dropping resistors until no voltage appears between plate and ground as far as the signal frequencies are concerned. Under these circumstances, the resistances of the voltage dropping resistors and the resistance of the resistor in the plate circuit can be combined in the proper manner to give the mutual conductance of the tube.

Another method of operation of the circuit becomes desirable when the circuit is being used in a tolerance limit testing equipment. In such use, it is desirable to know whether or not the tube falls above or below a certain pre-designed limit of the mutual conductance. In order to do this, the output of the system is fed into a phase sensitive circuit such that (1) an output of one phase will indicate that the actual mutual conductance of the tube is higher than the measuring system was set for, and (2) an output of the opposite phase will indicate that the tube has a lower mutual conductance than the measuring system was originally set for. Thus indication of "too high" or "too low" can be observed by a phase-sensitive detecting system.

This system is combined in my invention with a series of taps of the voltage dividing system supplying the voltage to the grid. This combination makes it possible to tell within which limits the mutual conductance of the tube falls. This is useful for quick production testing since it makes it unnecessary that the bridge be exactly balanced, or that an exact reading be obtained on the bridge for the value of the mutual conductance of the tube. Furthermore, it makes it possible to automatize the operation without the necessity for resorting to the complicated automatic systems employing servo-mechanisms which might be used to perfectly balance the measuring set each time a tube is to be measured.

This system of pre-set tolerances can be very handily incorporated in the original circuits, and it will be described later in this description.

A fundamental purpose of my invention then is to provide a means for measuring the transconductance of vacuum tubes by a simplified circuit in which the input and output have one terminal in common which can be used as the ground terminal.

A further purpose of my invention is to develop means for providing automatic testing equipment.

Still a further object of my invention is to provide novel means for determining whether the mutual conductance of a tube under test is within a predetermined limit, thus providing a go or no go test.

Still another object of my invention is to provide a circuit means for providing more rapid and stable measurements of whether the mutual conductance of a tube under test is within a predetermined limit.

Further purposes of my invention will become apparent from observation of the drawings in which Figure 1 is a drawing of the basic circuit without showing provisions for supplying the biasing potentials to the vacuum tube.

Figure 2 shows an equivalent circuit for Figure 1 as far as the alternating potentials are concerned.

Figure 3 shows the use of this circuit in a limit test bridge.

Figure 4 shows a relaying system for use with Figure 3 for automatic operation.

Figure 5 shows a modified form of the basic circuit of Figure 1 including the biasing potentials.

With reference to Figure 5, the tube under test 2 is supplied with its D. C. bias conditions by batteries 6, 7 and 8. These batteries are shown here by the symbol for batteries, but they may be regulated power supplies, unregulated power supplies, or any other form of supply for bias conditions that is desirable. In making these arrangements, however, care should ordinarily be taken that no signal is introduced on to any of the grids except the control grid.

Bias voltage for the control grid is shown here as being supplied by a cathode bias battery, but it could also be supplied by a grid bias battery in series between resistor 4 and ground. All of these batteries are assumed to have negligible impedance with respect to the signal and if it is not found that this is possible, these batteries or bias supplies may be by-passed with a sufficiently large capacitor or capacitors.

The test signal is introduced into the circuit through transformer 1. This signal may be any desired frequency in making the test, such as 60 cycles or an audio-frequency.

It is to be noted that although the secondary of transformer 1, which is directly connected to the tube circuit, is not at ground potential as far as the direct voltage is concerned, one end of it is at ground potential so far as the signal voltage is concerned. Part of the complete signal voltage is applied to the grid of the tube through the dropping resistors 3 and 4. The bias on the plate of the tube is blocked out of this grid supply circuit by capacitor 9. The actual value of this signal voltage applied to the grid is controllable by moving the slider up and down on the resistor 3, 4. Signal is likewise supplied to the plate of the tube through resistor 5. The signal voltage appearing at the plate of the tube is fed into the amplifier or indicator 11 through the blocking condenser 10. This circuit has the special property that by proper adjustment of the values of resistors 3, 4 and 5, the circuit can be made to operate so that there is no voltage fed to the indicator 11. When this condition is obtained, certain relationships exist among the various resistances in the circuit and the mutual conductance of the tube. These mathematical relationships may then be used to determine the value of the mutual conductance of the tube.

The particular equation which is applicable under these circumstances is Equation 1:

$$(1) \quad G_m = \frac{R_3 + R_4}{R_4 R_5}$$

In this equation, $G_m$ is the mutual conductance of the tube, and the resistances are represented by R's with subscripts which are the same as the numbers applied to the resistors in Figure 5. In order to show that this equation is applicable, reference is made to Figure 2. This is an equivalent circuit as far as the signal frequency is concerned to the circuit of Figure 5. In this circuit all the bias batteries have been disregarded as is customary in the analysis of such circuit.

The input voltage appearing on the secondary of the input transformer is represented by the symbol for a voltage source, and its value is labeled $V_{in}$. The vacuum tube has been replaced in this circuit by its equivalent circuit which is a resistor 12 whose value will be called $R_p$ in series with a voltage source 13, whose value is minus the amplification factor $\mu$ multiplied by the signal voltage appearing on the control grid. This symbolic representation for a vacuum tube is well known for these circuits and is discussed in detail on page 391 to page 400 of "Applied Electronics," published by John Wiley & Sons, 1943.

In this circuit, the current flowing through the vacuum tube is indicated as I. The following mathematical development is then applicable. The voltage on the grid $E_g$ is given by the following Equation 2 which simply shows that this voltage is obtained from the input voltage by the dropping resistors $R_3$ and $R_4$.

$$(2) \quad E_g = \frac{R_4}{R_3 + R_4} V_{in}$$

Applying the equivalent plate circuit theorem discussed above, the equivalent plate electromotive force is then given by Equation 3:

(3) Equivalent plate E. M. F. =

$$-\mu E_g = \frac{-\mu R_4}{R_3 + R_4} V_{in}$$

The current flowing through the tube then is determined by Equation 4:

$$(4) \quad I = \frac{V_{in}}{R_p + R_5}\left(1 + \frac{\mu R_4}{R_3 + R_4}\right)$$

in which the two electromotive forces, that is, the equivalent plate electromotive force and the input voltage are subtracted in series and are applied to the resistances $R_5$ and $R_p$ by well known equations. This current flowing through $R_5$ causes a drop in voltage from the input voltage $V_{in}$, so an equation for the output voltage $E_p$ which is the same as the plate voltage of the tube can be readily calculated as is done in Equation 5:

$$(5) \quad E_p = V_{in} - IR_5$$

Substitution of Equation 4 in Equation 5 for the current yields Equation 6:

$$(6) \quad E_p = \frac{V_{in}}{R_p + R_5}\left((R_p + R_5) - R_5 - \frac{\mu R_4 R_5}{R_3 + R_4}\right)$$

in which some factoring and algebraic rearrangement has been done. It is now proposed to adjust $R_3$ and $R_4$ until $E_p$ is zero. Observation of Equation 6 shows that the only way in which $E_p$ can be made zero is to make the quantity within the brackets equal to zero. When this is done Equation 7 results:

$$(7) \quad 0 = R_p - \frac{\mu R_4 R_5}{R_3 + R_4}$$

Solving Equation 7 for $R_p$ and dividing both sides of the equation by $\mu$, we get Equation 8:

$$(8) \quad \frac{R_p}{\mu} = \frac{R_4 R_5}{R_3 + R_4}$$

In vacuum tube theory, it is well known that the mutual conductance can be expressed in terms of amplification factor and the plate resistance by the equation (9) $$G_m = \frac{\mu}{R_p}$$

This fact is given on page 180, Equation 38, of the textbook referred to above. Applying this definition to Equation 8 gives Equation 10 which is the final equation for this bridge and is the same as Equation 1.

(10) $$G_m = \frac{R_3 + R_4}{R_4 R_5}$$

This indicates that by adjustment of at least one of $R_3$, $R_4$, and $R_5$, it is possible to balance this circuit so that no signal appears on the output in the indicator 11. It is to be observed that with this circuit any convenient arrangement for the measurement of plate voltage, plate current, or bias voltages so far as D. C. components are concerned, can readily be incorporated in the circuit. Furthermore, the mutual conductance can be determined for any value of voltage swing as far as the signal voltage is concerned. It is to be observed further that with this circuit no transformer is necessary in the indicator which can be a resistance-capacitance coupled amplifier. Elimination of this transformer is highly advantageous in view of the fact that a transformer in the input to an indicator is commonly a source of trouble since it has the property of picking up magnetic fields by its core, and sending the corresponding signals through the indicator. Moreover, this type of action may provide false indications on the indicator or lack of sensitivity.

This circuit avoids these difficulties since no transformer is necessary in the indicator because one terminal of the indicator can be grounded directly.

It will further be noted that the mutual conductance of a tube can be measured without any signal between plate and cathode under conditions of constant instantaneous plate voltage.

A simplification of this principle is shown in Figure 1. Here a signal source 1 is applied to the bridge in such a manner that in absence of grid signal substantially the full magnitude of the source voltage 1 appears between plate and cathode of the tube under test 2. A portion of the input signal as determined by resistors 3 and 4 is applied to the grid of the tube under test. The output of the bridge is taken between the plate and cathode of the tube and is read by means of a suitable vacuum tube voltmeter or other voltage responsive device. When the network is balanced, no signal appears between plate and cathode.

The modification of this transconductance test circuit to a transconductance limit tester of the go or no go variety is shown in Figures 3 and 4. Referring to Figure 3, it is observed that the basic circuit of Figure 5 is that which is enclosed in the dotted line labled "limit bridge." This circuit is modified in only one respect. The voltage divider which supplies the grid voltage has been replaced by a voltage divider which has two taps on it and the connection to the grid is formed by a switch 21 which enables the grid to be connected to either tap T or tap S on the voltage divider. When connected to tap T, the resistance $R_3$ in Equation 10 becomes the sum of the resistance values of resistor 18 and resistor 19. Likewise, the value $R_4$ in Equation 10 becomes the resistance value of resistor $R_{20}$. When the switch is connected so that the grid is connected to tap S, the value of $R_3$ becomes the resistance of resistor 18, and the value of $R_4$ becomes the resistance of resistors 19 and 20 added together. Under this arrangement, when the grid is connected to tap T, there is no output for one certain value of mutual conductance of the tube. Likewise, when the grid is connected to tap S, there is no output to the amplifier for another special value of mutual conductance of the tube.

Inspection of Equation 10 shows that since the sum of $R_3$ and $R_4$ remains constant, the mutual conductance is inversely proportional to $R_4$. Thus, as $R_4$ becomes larger, the mutual conductance necessary for balance becomes smaller. Consequently tap T corresponds to a higher value of mutual conductance than tap S. Consequently tap T is called the high limit test, and tap S is called the low limit test.

It now becomes desirable to determine whether or not a given tube is above or below the particular value set for tap S or tap T. This is accomplished by a phase discriminator circuit coupled to the output of the amplifier 27. Thus the output signal from the plate of the tube under test is applied through the amplifier 27 through the phase discriminator tube 29 which is a double triode.

This tube is so connected that the cathodes of the two parts of the tube are supplied with signal voltage 180° out of phase with respect to each other. With no signal from the limit bridge, no signal appears on the grid of tube 29, so the cathode to grid potential for both parts of this tube vary in opposition to each other by the same amount, because the secondary of the transformer 28 has its center tap grounded. As a consequence, the plate current in resistor 33 and resistor 32 is substantially the same and is arranged to be insufficient to cause the neon lights 31 and 34 to operate.

If now the limit bridge circuit is out-of-balance so that a signal is applied to the amplifier 27, a signal will be applied to the grid of tube 29. This signal will bear a certain phase relationship to the phase of the signal on the cathode of tube 29. In particular, it should bear the relationship that it is in phase with one of these cathode signals, and 180° out of phase with the other of these cathode signals. Consequently with one side of tube 29 having less variation in the grid to cathode potential, and the other side of tube 29 having a greater variation of grid to cathode potential, there will be more voltage swing across one of the resistors, let us say 32; consequently there will be enough voltage swing to fire the neon tube 31. However, there will be less voltage swing across resistor 33, at this same time so that neon tube 34 will not glow. Thus, as is in this particular circumstance, the unbalance of the limit bridge has caused one of the neon lights to glow.

A study of Equation 6 will now reveal that if the mutual conductance is too high, the voltage $E_p$ will have one phase, whereas if the mutual conductance is too low, the voltage $E_p$ will have the opposite phase. Consequently if in the previous discussion, it has been assumed that the limit bridge output arose from the fact that the tube under test had a mutual conductance which was too high, it would be found that if this tube should be such that it had a mutual conductance which was too low, the output to the amplifier 27 would be reversed in phase by 180°. This would then mean that in tube 29 the grid to cathode potential of the side which supplies resistor 32 would be in phase with each other; that is, this grid to cathode potential would become smaller than it would be without a signal, whereas the grid to cathode potential of the other side of the tube would become larger. This would cause a greater voltage swing across resistor 33 with consequent glowing of neon tube 34. Thus, lighting of neon tube 34 will indicate that the tube under test has a mutual conductance which is too low; whereas lighting of tube 31 will indicate that the tube under test has a mutual conductance which is too high. These relationships are of course determined by the phasing of the transformers, transformer 1 and transformer 28, and also by the phase shift in the amplifier 27. This amplifier preferably should be so designed that the phase shift is either close to zero or close to 180° for the signal voltage.

The operation of this system is as follows: Initially the grid of tube 2 is connected to terminal S; then the bridge will be balanced if tube 2 has a transconductance equal to that of the desired low limit. This low limit is established by suitable choice of plate load resistor 5 and the voltage dividing network comprising the resistors 18, 19 and 20. If the transconductance is greater than the amount established by this low limit, then the phase of the signal appearing at the plate of tube 2 will bear a particular relationship with respect to the phase of the signal applied to the input of the bridge by transformer 26. Let it be assumed that the phasing of amplifier 27 and transformers 1 and 28 is such that under this condition (that is, with the transconductance greater than the low limit and with the grid at point S) that neon light or other indicating device 31 will be operated while the second indicating device 34 of the phase discriminator will not be operated. Thus, with the grid of the tube at point S, if lamp 34 is lit, the tube has a transconductance greater than the established low limit, and hence under this condition the tube passes the low limit test satisfactorily.

Similarly, with the grid of the tube 2 switched to point T of the bridge, a test is made to insure that the transconductance of the tube is less than the high limit established by the values of resistors 5, 18, 19 and 20. This is accomplished in a similar manner to that described in connection with the low limit test. If, with the grid switched to point T, the transconductance is less than the high limit established by the constants of the bridge, then indicator lamp 31 will be operated, whereas lamp 34 will not be operated.

Thus, in the operation of the bridge of Figure 3, in order to ascertain that the tube under test is within the two predetermined limits, it is only necessary to switch the grid of the tube under test to point T and point S and to note that with the switch in either position the proper indicator shall be operated. If the same indicator operates with the switch in each position, then the tube is a reject as far as the limits established by the two positions are concerned.

Thus, a convenient test for acceptability of a given tube is whether or not the light changes from the "too high" lamp to the "too low" lamp when the switch 21 is changed from one tap to the other. If in changing this switch, the same lamp stays lit, the tube is outside of tolerance. If in changing the switch, the lamps also change, so that the one which was originally lit becomes dark and the one which was originally dark now becomes lit, the tube is acceptable. This is a rapid and stable method of operation of such a limit bridge. Furthermore, it can be determined by inspection of the lamps whether a tube which is out of the limit is too high or too low. For example, if under both conditions of switch 21, the "too high" lamp lights, then the mutual conductance is too high and it is above the high limit; whereas if under both conditions of the switch 21 the "too low" lamp lights, then the mutual conductance of the tube is below the low limit of the bridge. Consequently this bridge could be used to separate tubes into three catagories; those which are too high, those which are within tolerance, and those which are too low.

There exists the possibility that a tube should be exactly on one of the limits or close enough to one of the limits to cause the phase discriminator to be non-operative. Then under one position of the switch, neither lamp would light, whereas in the other position of the switch one lamp would light. Such a tube could be either classified as an accepted tube or a rejected tube depending upon the circumstances under which the bridge was to be used.

This circuit can be also adapted to automatic limit testing by a system such as that shown in Figure 4, which is arranged to automatically throw the switch 21 of Figure 3 from point T to point S, if the tube under test passes the high limit imposed at point T. If the tube does not pass the high limit, the switch remains at point T and indication is made of that fact.

In Figure 4 I have shown only the additional circuits and apparatus for effecting automatic operation of the circuit and apparatus of Figure 3.

To effect operation, switch 37 of Figure 4 is closed to prepare an energizing circuit for relay 38 from the source 30 through the back contacts of armature 40 to the plate at c of discriminator 29.

At this time the contact at 41 which replace the switch 21 of Figure 3 connect the grid of the tube under test over the terminals of tap G which extends to the grid of the tube under test to the tap T or high limit connection of resistor 20.

The phase discriminator 29 is connected to amplifier 27 in the manner shown in Figure 3 so that if the tube under test tests high, the side of the discriminator at c will become conducting as described hereinbefore. It will be noted, however, that preferably a bias source such as battery 52 is included so as to augment the maximum obtainable variation of average plate current in each half of the discriminator. The bias supplied thereby is preferably approximately equal to the numerical sum of the grid voltage for plate current cut-off plus the peak voltage induced in one half of the secondary of transformer 28. This battery therefore serves to prevent either half of discriminator 29 from conducting plate current in the absence of a signal applied between grid and ground. In the presence of such a signal only one half will become conductive.

The circuit for relay 38 described above is completed to energize this relay through side c of the discriminator when the tube under test tests high. Contact 42 of relay 38 is thereupon closed and a circuit is completed from terminal x through battery 51 over closed contacts 42 and contacts 43 of relay 39 to terminal y. Across terminals x and y is connected an indicating device corresponding to one of the glow lamps of Figure 3.

The closing of switch 37, described above, also completed an energized circuit for relay 39 over contact 45. Relay 39 is, however, slow to operate so that if the operations described above occur, relay 38 will energize before relay 39 can energize and the energizing circuit for this relay will be opened at contact 45 before relay 39 can energize.

If, however, the tube under test is such that the tube at c does not become conducting so that relay 38 is not energized, relay 39 will energize. An energizing circuit is thereupon prepared for relay 38 over the front contacts of armature 40 to the phase discriminator 29 at B.

Simultaneously the tap G is switched at 41 from terminal T to terminal S. If the tube under test now causes the phase discriminator 29 to become conducting at B, as described hereinabove, relay 38 will be energized to complete a circuit from terminal x through battery 51 over contact 42 and over contact 43 now in engagement with its front contact to terminal V extending to an indicating device.

During the above described operations, the circuit for relay 39 is opened at 45 but relay 39 being slow to de-energize will not de-energize until the indication is made. While in the above I have referred to indicators connected to y and v, these may be replaced by accepting or rejecting mechanisms of any well known form.

Thus this apparatus of Figure 4 may be used as a part of an automatic tester which feeds tubes continuously into a test position. After one tube has been moved into the test position, contacts 37 are closed by the mechanical presence of the tube in the test, thereby starting the test of the tube. If continuity is indicated from terminal x to terminal v or y, then the tube under test is automatically routed to either one of a suitable reject box so that the next tube tested may move into the test position. If terminal x is not closed by relay 38 to either terminal v or y, then the tube under test is routed after a reasonable delay time after operation of relay 39 to a collecting box or other machines, such as branders, testers, etc.

If relay 38 is not energized in either of the situations described above, then switch 37 is opened and reclosed as for example, under control of the removal and insertion of a tube under test. Relay 39 is de-energized and the above described operations are repeated.

The fundamentals of my invention then are a novel type of testing circuits for measuring the mutual conductance of a vacuum tube, and ways and means of applying this circuit to automatic testing of tubes or to simple limit testing of tubes, such as would be done in the production of such tubes. There are, of course, modifications of these systems which could be made without changing the essential features of this invention.

Throughout the specification and claims the term "plate" has been employed but it will be understood that this broadly applies to any anode of a tube such as the second grid of a pentode which functions as an anode.

Consequently I prefer to be limited by the following claims.

I claim:

1. In a system for measuring mutual conductance of a vacuum tube, including a plate, grid and cathode, a source of alternating signal energy, a plate resistor, means for supplying plate voltage to said plate from said source to said tube being measured through said plate resistor, a voltage dividing resistor network, means for supplying alternating signal voltage from said source to said tube grid through said voltage divider network, an indicator connected across the plate and cathode of said vacuum tube and means for adjusting said network to effect a balance between the alternating voltage generated within the tube by the change in grid voltage and the alternating voltage appearing across the resistor in the plate circuit.

2. In a system for measuring mutual conductance of a vacuum tube, including a plate, grid and cathode, a source of alternating signal energy, a plate resistor, means for supplying plate voltage to said plate from said source to said tube being measured through said plate resistor, a voltage dividing resistor network, means for supplying alternating signal voltage from said source to said tube grid through said voltage divider network, a terminal of said alternating signal source and an end of said resistor network being connected to ground, an indicator connected across the plate and cathode of said vacuum tube, and means for adjusting said network to effect a balance between the alternating voltage generated within the tube by the change in grid voltage and the voltage appearing across the resistor in the plate circuit, whereby there is no alternating current component of potential between plate and ground and the mutual conductance of the tube is a function of the dropping resistors in the voltage dividing resistor network and of the plate resistor.

3. In a system for measuring mutual conductance of a vacuum tube, including a plate, grid and cathode, a source of alternating signal energy, one terminal of which is grounded, a plate impedance, means for supplying plate voltage to said plate from said source to said tube being measured through said plate impedance, a voltage dividing network, means for supplying voltage from said source to said tube grid through said voltage dividing network, an indicator connected across the plate and cathode of said vacuum tube and means for adjusting the grid controlling network until no signal voltage appears between the plate and ground from said source, the relative values in said network and plate impedance being thereupon a function of the mutual conductance of the tube.

4. In a system for measuring mutual conductance of a vacuum tube, including a plate, grid and cathode, a source of signal energy, one terminal of which is grounded, a plate impedance, means for supplying plate voltage to said plate from said source to said tube being measured through said plate impedance, a voltage dividing network, means for supplying voltage from said source to said tube grid through said voltage dividing network, phase responsive means connected in the output circuit of the tube between said plate and cathode, the aforesaid components of said system being arranged whereby the output signal in said output circuit is substantially zero when said tube conductance is a predetermined value and other than zero and of variable phase when said mutual conductance is above or below said predetermined value, and means including said phase responsive device for indicating an output of one phase indicative of a higher mutual conductance and an output of the opposite phase indicative of a lower mutual conductance than said predetermined value.

5. In a system for measuring mutual conductance of a vacuum tube, including a plate grid and cathode, a source of signal energy, a plate impendance, means for supplying plate voltage to said plate from said source to said tube being measured through said plate impedance, a voltage dividing network, means for supplying voltage from said source to said tube grid through said voltage dividing network, phase responsive means connected in the output circuit of the tube between said plate and cathode, the aforesaid components of said system being arranged whereby the output signal in said output circuit is substantially zero when said tube conductance is a predetermined value and other than zero and of variable phase when said mutual conductance is above or below said predetermined value, and means including said phase responsive device for indicating an output of one phase indicative of a higher mutual conductance and an output of the opposite phase indicative of a lower mutual conductance than said predetermined value, said network having taps, a switch for making selective connections to said taps for varying the grid voltage whereby the mutual conductance is indicated between limits.

6. In a system for measuring mutual conductance of a vacuum tube having a cathode, plate and anode, a null bridge circuit, the tube under measurement forming one branch of said bridge circuit, a source of signal energy, means including one terminal said bridge circuit for applying plate voltage and another terminal of said bridge circuit for applying grid voltage from said source the plate and grid respectively of the tube being measured, and an indicating device connected between the anode and cathode of said tube, one terminal of said indicating device and one terminal of said signal energy source being connected together and to ground.

7. In a system for measuring mutual conductance of a vacuum tube, including a plate, grid and cathode, a null bridge circuit having resistances in three branches and the tube being measured in the fourth branch, a source of signal energy connected to said null circuit, means including said bridge circuit for applying plate and grid voltages from said source to the plate and grid respectively of the tube being measured, and an indicating device connected between the anode and cathode of said tube, one terminal of said indicating device and one terminal of said signal energy source being connected together and to ground.

8. In a system for measuring mutual conductance of a vacuum tube, including a plate, grid and cathode, a null bridge circuit having resistances in three branches and the tube being measured in the fourth branch, a source of signal energy connected to said bridge circuit, the plate voltage to the plate of said tube being fed from said source through one branch resistance and the grid potential to the grid of said tube being determined by the potential existing between the two other branch resistors, and an indicating device connected to said tube, between said plate and cathode, one terminal of said indicating device and one terminal of said signal energy source being connected together and to ground.

9. In a system for measuring mutual conductance of a vacuum tube having a cathode, a plate, and grid, a null bridge circuit having resistances $R_3$, $R_4$ and $R_5$ each connected in individual branches of said bridge circuit and the tube being measured in the fourth branch, a source of signal energy for said circuit means including said null circuit for applying plate and grid voltages from said source to the plate and grid respectively of the tube being measured, and an indicating device connected between the anode and cathode of said tube, one terminal of said indicating device and one terminal of said signal energy source being connected together and to ground, said null circuit connections being such that the mutual conductance $G_m$ of the tube is expressed by the formula $$G_m = \frac{R_3 + R_4}{R_4 R_5}$$

10. In a system for measuring mutual conductance of a vacuum tube having a cathode, a plate and grid, a null bridge circuit comprising resistances $R_3$, $R_4$, $R_5$, and the tube being measured, a source of energy for said bridge circuit means including said null circuit for applying plate and grid voltages from said source to the plate and grid respectively of the tube being measured, and an indicating device connected between the anode and cathode of said tube, one terminal of said indicating device and one terminal of said signal energy source being connected together and to ground, said circuit connections being such that the mutual conductance $G_m$ of the tube is expressed by the formula $$G_m = \frac{R_3 + R_4}{R_4 R_5}$$

11. In a system for measuring mutual conductance of a vacuum tube having a cathode, a plate and grid, a null bridge circuit comprising resistances $R_3$, $R_4$, $R_5$, and the tube being measured, a source of signal energy for said bridge circuit means including said null circuit for applying plate and grid voltages from said source to the plate and grid respectively of the tube being measured, and an indicating device connected between the anode and cathode of said tube, one terminal of said indicating device and one terminal of said signal energy source being connected together and to ground, said bridge circuit connections being such that the signal component of the plate voltage of the tube being measured is made zero by adjustments of the value of one of said resistors until the formula $$\frac{R_p}{\mu} = \frac{R_4 R_5}{R_3 + R_4}$$

obtains.

12. In a system for measuring mutual conductance of a vacuum tube including a plate, grid, and cathode, a null bridge circuit having resistances in three branches and the tube being measured in the fourth branch, a source of signal energy connected to said bridge circuit, means including said null circuit for applying plate and grid voltages from said source to the plate and grid respectively of the tube being measured, and an indicating device connected between said plate and cathode of said tube, said null circuit and source being grounded.

13. In a system for measuring mutual conductance of a vacuum tube, including a plate, grid and cathode, a null bridge circuit, a source of signal energy, means including said bridge circuit for applying plate and grid voltages from said source to the plate and grid respectively of the tube being measured, and an indicating device connected between said plate and cathode of said tube and energized from said source, one terminal of said null circuit, said indicating device and said signal source being connected in common.

14. In a system for measuring mutual conductance of a vacuum tube, including a plate, grid and cathode, a source of signal energy, a plate impedance, means for supplying plate voltage from said source to the plate of said tube being measured through said plate impedance, a voltage dividing network, means for supplying voltage from said source to said tube grid through said voltage dividing network, phase responsive means connected in the output circuit of the tube, between said cathode and plate, the aforesaid components of said system being arranged whereby the output signal in said output circuit is substantially zero when said tube conductance is a predetermined value and other than zero and of variable phase when said mutual conductance is above or below said predetermined value, means including said phase responsive means for indicating an output of one phase indicative of a higher mutual conductance and an output of the opposite phase indicative of a lower mutual conductance than said predetermined value, and means controlled by said phase responsive means for automatically operating said switch and indicating the mutual conductance within limits.

15. In a system for measuring mutual conductance of a vacuum tube, including a plate, grid and cathode, a source of signal energy, a plate impedance, means for supplying plate voltage from said source to the plate of said tube being measured through said plate impedance, a voltage dividing network, means for supplying voltage from said source to said tube grid through said voltage dividing network, phase responsive means connected in the output circuit of the tube, between said cathode and plate the aforesaid components of said system being arranged whereby the output signal in said output circuit is substantially zero when said tube conductance is a predetermined value and other than zero and of variable phase when said mutual conductance is above or below said predetermined value, means including said phase responsive device for indicating an output of one phase indicative of a higher mutual conductance and an output of the opposite phase indicative of a lower mutual conductance than said predetermined value, means controlled by said phase responsive device for automatically indicating the mutual conductance within limits, and means controlled by said phase responsive device for rejecting or accepting said tube in accordance with the conductance of said tube.

16. In a system for measuring mutual conductance of a vacuum tube, including a plate, grid and cathode, a source of signal energy, a plate impedance, means for supplying plate voltage from said source to the plate of said tube being measured through said plate impedance, a voltage dividing network, means for supplying voltage from said source to said tube grid through said voltage dividing network, and means connected between said cathode and plate operative in accordance with the conductance of the tube under test for rejecting or accepting said tube.

17. In a system for measuring mutual conductance of a vacuum tube, including a plate, grid and cathode, a source of signal energy, a plate impedance, means for supplying plate voltage from said source to the plate of said tube being measured through said plate impedance, a voltage dividing network, means for supplying voltage from said source to said tube grid through said voltage dividing network, phase responsive means connected in the output circuit of the tube, between said cathode and plate the aforesaid components of said system being arranged whereby the output signal in said output circuit is substantially zero when said tube conductance is a predetermined value and other than zero and of variable phase when said mutual conductance is above or below said predetermined value, means including said phase responsive means for indicating an output of one phase indicative of a higher mutual conductance and an output of the opposite phase indicative of a lower mutual conductance than said predetermined value, and means operative in accordance with the conductance of the tube under test for rejecting or accepting said tube.

18. In a system for measuring mutual conductance of a vacuum tube, including a plate, grid and cathode, a source of signal energy, a plate impedance, means for supplying plate voltage from said source to the plate of said tube being measured through said plate impedance, a voltage dividing resistor network, means for supplying voltage from said source to said tube grid through said voltage divider network, an indicator connected across the plate and cathode of said vacuum tube and means including said network for determining whether the mutual conductance of said tube has a value between predetermined limits.

19. In a limit test apparatus for measuring mutual conductance of an electronic discharge device in one branch thereof and having a cathode, plate and grid, a bridge circuit including said device, an output circuit for said bridge including an indicator, circuit connections including said bridge circuit from said source to the anode and from a terminal of the bridge to the grid electrode whereby the magnitude of which becomes minimum as the value of said mutual conductance approaches a predetermined limit, and an indicator connected between the plate and cathode of said tube responsive to the phase of said output signal with respect to the phase of said signal source.

DAVID E. SUNSTEIN.

REFERENCES CITED

The following references are of record in the file of this patent:

UNITED STATES PATENTS

| Number | Name | Date |
|---|---|---|
| 1,989,394 | Aull | Jan. 29, 1935 |

OTHER REFERENCES

"Theory and Application of Electron Tubes," by H. J. Reich (copy in Div. 54).

"Electron Tubes in Industry," by K. Henry, 1934 (p. 94), copy in Div. 54.

"High Frequency Measurements," by A. Hund, 1933 (p. 333), published by McGraw-Hill Book Co., New York, N. Y.